United States Patent
Moon et al.

(10) Patent No.: US 11,743,568 B2
(45) Date of Patent: Aug. 29, 2023

(54) ELECTRONIC DEVICE AND DRIVING METHOD OF ELECTRONIC DEVICE

(71) Applicant: SAMSUNG DISPLAY CO., LTD., Yongin-si (KR)

(72) Inventors: Dongwon Moon, Seoul (KR); Sungyoon Jo, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 11 days.

(21) Appl. No.: 17/361,706

(22) Filed: Jun. 29, 2021

(65) Prior Publication Data
US 2022/0078316 A1   Mar. 10, 2022

(30) Foreign Application Priority Data

Sep. 7, 2020 (KR) .......................... 10-2020-0114060

(51) Int. Cl.
*G06F 3/041* (2006.01)
*G09G 3/20* (2006.01)
*H04N 23/57* (2023.01)
*H04N 23/55* (2023.01)

(52) U.S. Cl.
CPC .......... *H04N 23/57* (2023.01); *G06F 3/0412* (2013.01); *G09G 3/20* (2013.01); *H04N 23/55* (2023.01)

(58) Field of Classification Search
None
See application file for complete search history.

(56) References Cited

U.S. PATENT DOCUMENTS

| | | | |
|---|---|---|---|
| 8,009,971 B2 | 8/2011 | Koo et al. | |
| 9,936,113 B2 | 4/2018 | Lee et al. | |
| 10,477,082 B2 | 11/2019 | Jung et al. | |
| 10,863,091 B2 | 12/2020 | Song et al. | |
| 2014/0267693 A1* | 9/2014 | Newman | F03D 17/00 348/128 |
| 2017/0011503 A1* | 1/2017 | Newman | F03D 1/0675 |
| 2018/0184070 A1* | 6/2018 | Nash | H04N 23/67 |
| 2018/0243045 A1* | 8/2018 | Franjic | H04N 23/80 |
| 2019/0258314 A1* | 8/2019 | Ollila | G02B 27/0172 |

FOREIGN PATENT DOCUMENTS

| | | |
|---|---|---|
| KR | 10-0819301 | 4/2008 |
| KR | 1020170030789 | 3/2017 |
| KR | 1020180078576 | 7/2018 |
| KR | 1020190020533 | 3/2019 |

* cited by examiner

*Primary Examiner* — Talha M Nawaz
(74) *Attorney, Agent, or Firm* — F. Chau & Associates, LLC (57) ABSTRACT

A electronic device includes a display panel including a first region in which a plurality of pixels and a second region having a higher transmittance than the first region, and an electronic module disposed under the display panel and overlapping the second region. The electronic module includes a camera module configured to image a subject to obtain a plurality of first images having a first resolution, an actuator configured to move the camera module while capturing each of the plurality of first images, and a processor configured to obtain a second image having a second resolution higher than the first resolution using the first images captured.

20 Claims, 9 Drawing Sheets

ELECTRONIC DEVICE AND DRIVING METHOD OF ELECTRONIC DEVICE

CROSS-REFERENCE TO RELATED APPLICATIONS

This U.S. non-provisional patent application claims priority under 35 U.S.C. § 119 to Korean Patent Application No. 10-2020-0114060, filed on Sep. 7, 2020, the entire disclosure of which is incorporated by reference herein.

1. TECHNICAL FIELD

The present disclosure herein relates to an electronic device and a driving method of the electronic device, and more particularly, to an electronic device including an under panel camera (UPC) and a driving method of the electronic device.

2. DISCUSSION OF RELATED ART

An electronic device such as a Smartphone or a Tablet personal computer (pc) may include various electronic components such as a display panel, an input device for detecting an external input, and an electronic module. The electronic components may be electrically connected to each other through variously arranged signal lines. The display panel includes pixels for displaying an image. The input detection device may include detection electrodes for detecting an external input. The electronic module may include a camera, an infrared detection sensor, and a proximity sensor. When the electronic module is arranged under the display panel, the camera may be referred to as an under panel camera (UPC). The UPC may be used to authenticate a user, capture images, or record videos. However, the quality of images captured by an UPC are typically inferior to those of rear facing cameras.

SUMMARY

At least one embodiment of the present disclosure provides an electronic device including a camera with improved image quality and a driving method of the electronic device.

An embodiment of the inventive concept provides an electronic device including a display panel and an electronic module. The display panel includes a first region with a plurality of pixels and a second region having a higher transmittance than the first region. The electronic module is disposed under the display panel and overlaps the second region. The electronic module includes: a camera module, an actuator, and a processor. The camera module is configured to image a subject to obtain a plurality of first images having a first resolution. The actuator is configured to move the camera module while capturing each of the plurality of first images. The processor is configured to obtain a second image having a second resolution higher than the first resolution using the first images captured.

In an embodiment, the camera module includes a lens configured to collect light emitted from the subject and an image sensor configured to obtain the first images using the collected light.

In an embodiment, the actuator controls movement of the camera module so that the plurality of first images are captured at different locations respectively.

In an embodiment, the processor obtains the second image from the first images through a super-resolution algorithm.

In an embodiment, the actuator controls movement of the camera module within the second region.

In an embodiment, the second region includes a plurality of light-emitting regions in which pixels are arranged and a plurality of signal transmissive regions adjacent to the plurality of light-emitting regions respectively.

In an embodiment, the camera module includes a pattern sensor configured to collect first pattern information about a layout pattern of the plurality of signal transmissive regions.

In an embodiment, the processor determines second pattern information about a location pattern in which the actuator moves based on the first pattern information collected from the pattern sensor, and transfers the second pattern information to the actuator.

In an embodiment, the actuator controls movement of the camera module based on the second pattern information.

In an embodiment, the processor includes an actuator driving unit, an imaging unit, and a resolution processing unit. The actuator driving unit is configured to control movement of the actuator for moving the camera module. The imaging unit is configured to control an imaging operation of the camera module. The resolution processing unit is configured to generate the second image by converting the plurality of first images.

In an embodiment, the actuator driving unit controls the movement of the actuator based on pattern information about a layout pattern of signal transmissive regions arranged in the second region.

In an embodiment, the processor receives transmittance information about the transmittance of the second region of the display panel, and controls the camera module and the actuator based on the received transmittance information.

In an embodiment, the transmittance of the second region is inversely proportional to the number of the plurality of first images.

In an embodiment of the inventive concept, an electronic device includes: a display panel, an electronic module, and a processor. The display panel includes a first region in which a plurality of pixels are arranged and a second region having a higher transmittance than the first region. The electronic module is disposed under the display panel and includes a camera and an actuator. The camera module overlaps the second region. The actuator is connected to the camera module. The processor is configured to control an operation of the electronic module. The processor includes: an actuator driving unit, an imaging unit, and a resolution processing unit. The actuator driving unit is configured to instruct the actuator to move the camera module to a plurality of locations. The imaging unit is configured to image a subject to obtain a plurality of first images having a first resolution at the plurality of locations. The resolution processing unit is configured to generate a second image having a second resolution higher than the first resolution using the plurality of first images.

In an embodiment, the plurality of locations are present within the second region.

In an embodiment, the second region includes a plurality of light-emitting regions in which pixels are arranged and a plurality of signal transmissive regions adjacent to the plurality of light-emitting regions respectively.

In an embodiment, the actuator driving unit determines a location pattern of the plurality of locations to which the actuator is moved, based on a layout pattern of the plurality of signal transmissive regions.

In an embodiment, the electronic module includes the processor.

In an embodiment, the electronic device further includes a control module configured to control operation of the display panel and the electronic module, wherein the control module includes the processor.

In an embodiment of the inventive concept, a driving method of an electronic device includes: moving, by an actuator of an electronic module, a camera module of the electronic module to a plurality of locations; capturing, by the camera module, a plurality of different first images having a first resolution at the plurality of locations during the moving; and obtaining, by a processor, a second image having a second resolution higher than the first resolution from the plurality of first images. In the method, the electronic module is disposed under a display panel, the display panel includes a first region including a plurality of a pixels and a second region having a higher transmittance that the first region, the electronic module overlaps the second region, and the locations are located within the second region.

An embodiment of the inventive concept provides an electronic device including a display panel, a processor, and an electronic module. The display panel includes a first region having a plurality of first pixels of a first density and a second region having a plurality of second pixels of a second density smaller than the first density. The electronic module is disposed under the display panel and overlaps the second region. The electronic module includes a camera configured to obtain a plurality of first images having a first resolution and an actuator configured to move the camera to different positions while capturing the plurality of first images. The processor is configured to obtain a second image having a second resolution higher than the first resolution from the first images captured.

In an embodiment, the second region includes a first sub-region of a first transmittance comprising the second pixels and a second sub-region of a second transmittance higher than the first transmittance excluding any pixel.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. In the drawings, the thicknesses, ratios, and dimensions of elements may be exaggerated for clarity of illustration. As used herein, the term "and/or" includes any combinations that can be defined by associated elements.

The terms "first", "second" and the like may be used for describing various elements, but the elements should not be construed as being limited by the terms. Such terms are only used for distinguishing one element from other elements. For example, a first element could be termed a second element and vice versa without departing from the teachings of the present disclosure. The terms of a singular form may include plural forms unless otherwise specified.

Furthermore, the terms "under", "lower side", "on", "upper side", and the like are used to describe association relationships among elements illustrated in the drawings. The terms, which are relative concepts, are used on the basis of directions illustrated in the drawings.

Hereinafter, embodiments of the inventive concept will be described in detail with reference to the accompanying drawings.

Figure 1:
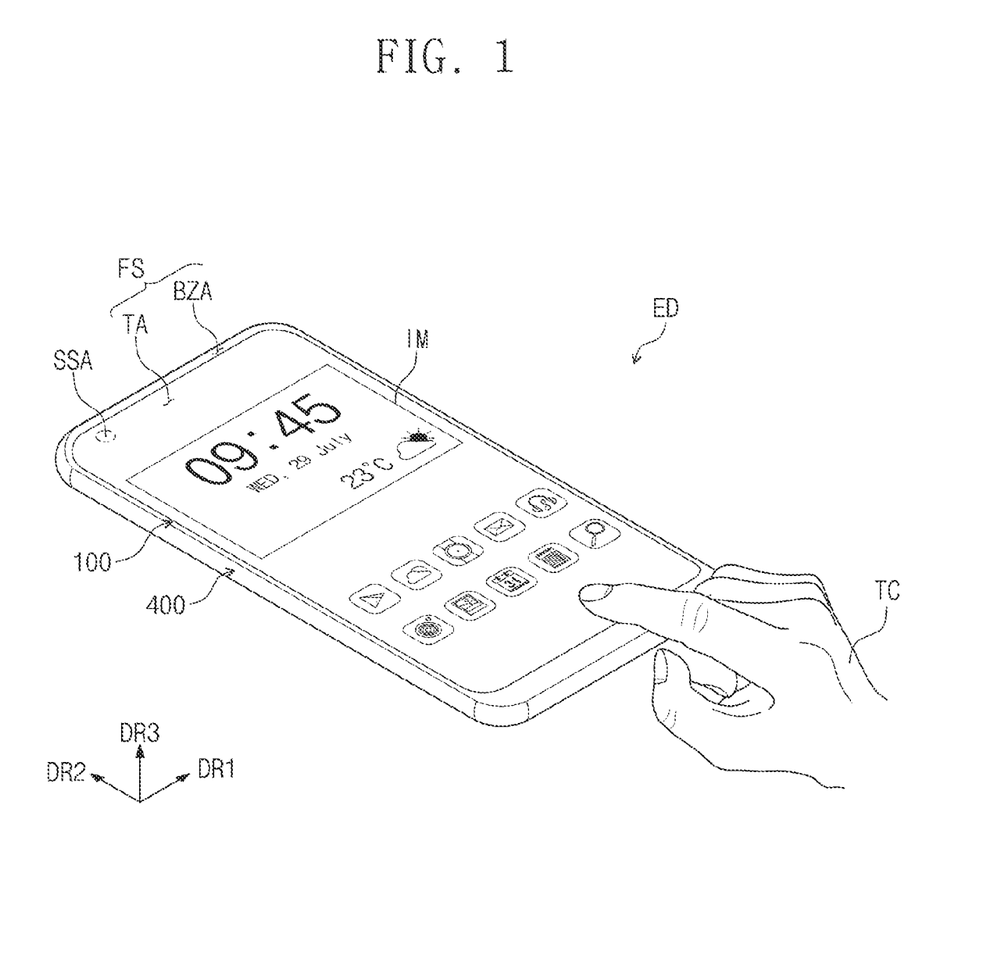
FIG. 1 is a perspective view illustrating an electronic device according to an embodiment of the inventive concept.
Figure 2:
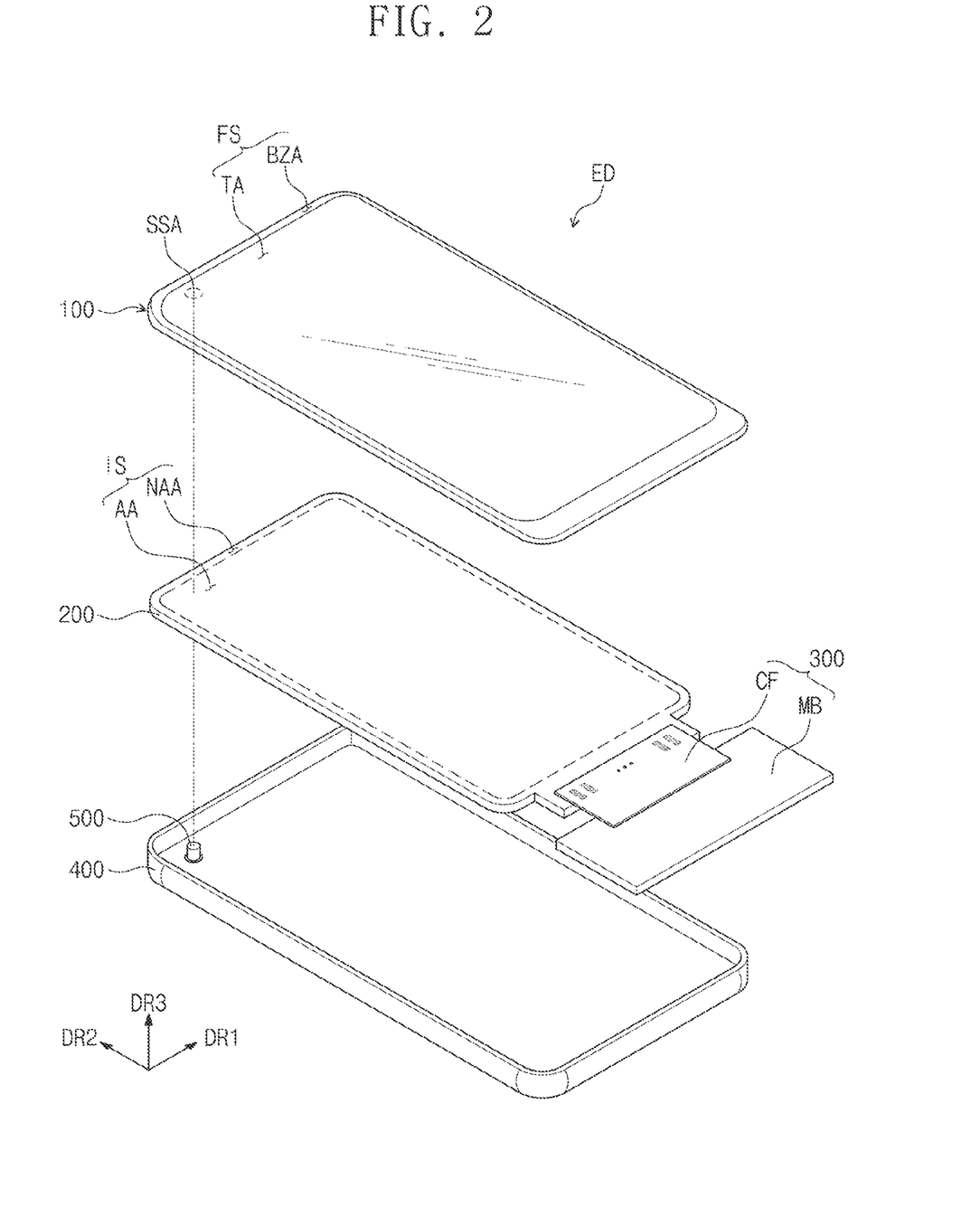
FIG. 2 is an exploded perspective view illustrating an electronic device according to an embodiment of the inventive concept.

FIG. 1 is a perspective view illustrating an electronic device according to an embodiment of the inventive concept, and FIG. 2 is an exploded perspective view illustrating an electronic device according to an embodiment of the inventive concept.

Referring to FIGS. 1 and 2, an electronic device ED may be a device activated in response to an electric signal. The electronic device ED may include various embodiments. For example, the electronic device ED may be used not only in large-size electronic devices such as a television, a monitor, or an outdoor billboard but also in small- and medium-size electronic devices such as a personal computer, a Tablet, a laptop computer, a personal digital assistant, a vehicle navigation unit, a gaming system, a portable electronic device, and a camera. These devices are merely examples, and thus the display device may be adopted in other electronic devices without departing from the inventive concept. In the present embodiment, the electronic device ED is illustrated as a Smartphone or a mobile device.

The electronic device ED may display an image IM in a third direction DR3 on a display surface FS parallel to each of a first direction DR1 and a second direction DR2. The display surface FS, on which the image IM is displayed, may correspond to a front surface of the electronic device ED and may correspond to a front surface FS of a window 100. Hereinafter, the display surface and front surface of the electronic device ED and the front surface of the window 100 may be referred to by the same reference sign. The image IM may include not only a dynamic (or moving) image but also a still (or static) image. A clock window and application icons are illustrated as an example of the image IM in FIG. 1.

In the present embodiment, front surfaces (or top surfaces) and rear surfaces (or bottom surfaces) of members may be defined based on the direction in which the image IM is displayed. The front surfaces and the rear surfaces may face each other in the third direction DR3, and a normal direction of each of the front surfaces and the rear surfaces may be parallel with the third direction DR3. The third direction DR3 may intersect with the first direction DR1 and the second direction DR2. The first direction DR1, the second direction DR2, and the third direction DR3 may be perpendicular to each other.

Herein, a surface defined by the first direction DR1 and the second direction DR2 may be defined as a plane, and the wording "in a plan view" may define a state of being viewed in the third direction DR3.

In an embodiment, the electronic device ED includes the window 100, a display device 200, a driving circuit unit 300, a housing 400, and an electronic module 500. In the present embodiment, the window 100 and the housing 400 may be coupled to each other to form an exterior of the electronic device ED.

The window 100 may include an optically clear insulating material. For example, the window 100 may include glass or plastic. The window 100 may have a multi-layer structure or single-layer structure. For example, the window 100 may include a plurality of plastic films bonded by an adhesive or may include a glass substrate and a plastic film bonded by an adhesive.

In a plan view, the window 100 may be divided into a transmissive region TA and a bezel region BZA. The transmissive region TA may be an optically clear region. The bezel region BZA may have a relatively low light transmittance compared to the transmissive region TA. The bezel region BZA may define a shape of the transmissive region TA. The bezel region BZA may be adjacent to and surround the transmissive region TA.

The bezel region BZA may have a predetermined color. The bezel region BZA may cover a peripheral region NAA of the display device 200 to prevent the peripheral region NAA from being externally viewed. However, this is merely illustrative, and the bezel region BZA may be omitted from the window 100 according to an embodiment of the inventive concept.

In an embodiment of the inventive concept, a sensing region SSA overlaps the electronic module 500. The electronic device ED may receive an external signal required for the electronic module 500 via the sensing region SSA, or may externally provide a signal output from the electronic module 500. According to an embodiment of the inventive concept, the sensing region SSA overlaps the transmissive region TA. Therefore, an additional region that provides the sensing region SSA outside the transmissive region TA may be omitted. Accordingly, an area of the bezel region BZA may be reduced.

Although FIGS. 1 and 2 illustrates one sensing region SSA, embodiments of the inventive concept are not limited thereto. For example, a plurality of at least two sensing regions SSA may be defined. Furthermore, although FIGS. 1 and 2 illustrate the sensing region SSA as being defined on an upper left side of the transmissive region TA, the sensing region SSA may be located in various other various regions such as an upper right side of the transmissive region TA, a center portion of the transmissive region TA, a lower left side of the transmissive region TA, or a lower right side of the transmissive region TA.

The display device 200 may be arranged under the window 100. The display device 200 may display the image IM. The display device 200 may include a front surface IS including an active region AA and the peripheral region NAA. The active region AA may be a region which is activated in response to an electric signal. In an embodiment, the active region AA include a plurality of pixels for displaying the image IM.

In the present embodiment, the active region AA may be a region in which the image IM is displayed. The transmissive region TA may overlap the active region AA. For example, the transmissive region TA may overlap an entire surface of the active region AA or at least a portion thereof. Accordingly, a user may view the image IM through the transmissive region TA.

The peripheral region NAA may be a region covered with the bezel region BZA. The peripheral region NAA may be adjacent to the active region AA. The peripheral region NAA may surround the active region AA. A driving circuit or driving wiring for driving the active region AA may be arranged in the peripheral region NAA.

In the present embodiment, the display device 200 is assembled in a flat state in which the active region AA and the peripheral region NAA face the window 100. However, this is merely illustrative, and a portion of the peripheral region NAA may be bent. Here, a portion of the peripheral region NAA may be oriented to a rear surface of the electronic device ED so that an area of the bezel region BZA occupying the front surface of the electronic device ED may be reduced. Alternatively, the display device 200 may be assembled in a state in which a portion of the active region AA is bent. Alternatively, in the display device 200 according to an embodiment of the inventive concept, the peripheral region NAA is omitted.

The driving circuit unit 300 may be electrically connected to the display device 200. The driving circuit unit 300 may include a main circuit board MB and a flexible film CF.

The flexible film CF may be electrically connected to the display device 200. The flexible film CF may be connected to pads of the display device 200 arranged in the peripheral region NAA. The flexible film CF may provide, to the display device 200, an electric signal for driving the display device 200. The electric signal may be generated in the flexible film CF or in the main circuit board MB. The main circuit board MB may include various driving circuits for driving the display device 200 or a connector for supplying power.

In an embodiment of the inventive concept, a region of the display device 200 corresponding to the sensing region SSA has a relatively high transmittance compared to the active region AA that does not overlap the sensing region SSA. For example, at least a portion of elements of the display device 200 may be removed. Therefore, the electronic module 500 may easily transfer and/or receive signals via the sensing region SSA.

In an embodiment, the electronic module 500 is arranged under the display device 200. In an embodiment, the electronic module 500 is arranged under a display panel of the display device. The electronic module 500 may overlap the sensing region SSA in a plan view. The electronic module 500 may receive an external input transferred through the sensing region SSA or may provide an output through the sensing region SSA. In an embodiment, the electronic module 500 includes a camera module (e.g., a circuit) and related electronic components. The camera module may include a camera and various sensors such as an infrared detection sensor and a proximity sensor.

The housing 400 may be coupled to the window 100. The housing 400 may provide an internal space by being coupled to the window 100. The display device 200 and the electronic module 500 may be housed within the internal space.

The housing 400 may include a material having a relatively high rigidity. For example, the housing 400 may include glass, plastic, or metal or may include a plurality of frames and/or plates configured with a combination thereof. The housing 400 may stably protect elements of the electronic device ED housed in the internal space from an external impact.

Figure 3:
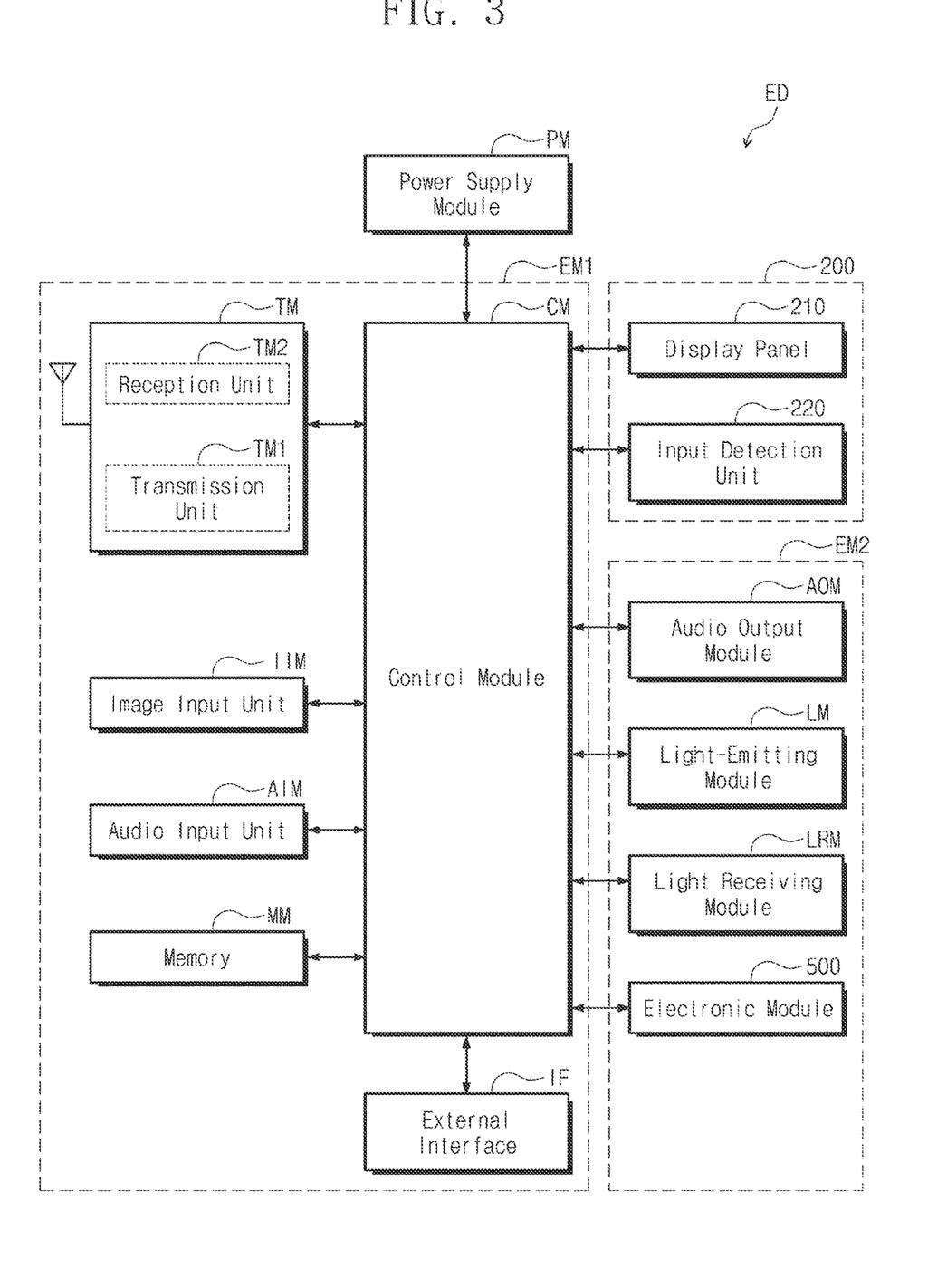
FIG. 3 is a block diagram illustrating an electronic device according to an embodiment of the inventive concept.

FIG. 3 is a block diagram illustrating an electronic device according to an embodiment of the inventive concept.

Referring to FIG. 3, the electronic device ED include the display device 200, a power supply module PM (e.g., a power supply), a first electronic module EM1 (e.g., a first electronic circuit), and a second electronic module EM2 (e.g., a second electronic circuit). The display device 200, the power supply module PM, the first electronic module EM1, and the second electronic module EM2 may be electrically connected to each other.

The display device 200 may include a display panel 210 and an input detection unit 220 (e.g., an input detection circuit or input detection device).

The display panel 210 may substantially generate the image IM. The image IM generated by the display panel 210 is displayed on the front surface IS and externally viewed by the user through the transmissive region TA.

The input detection unit 220 detects an external input TC that is externally applied. For example, the input detection unit 220 may detect the external input TC provided from the window 100. The external input TC may be a user's input. The user's input includes various types of external inputs such as a part of a user's body, light, heat, pen, or pressure.

In the present embodiment, the external input TC is illustrated as a user's hand applied to the front surface FS. However, this is merely illustrative, and the external input TC may be provided in various forms as described above, and, according to a structure of the electronic device ED, the external input TC may be applied to a side or rear surface of the electronic device ED, and is not limited to a certain embodiment.

The power supply module PM supplies power required for overall operation of the electronic device ED. The power supply module PM may include a battery module.

The first electronic module EM1 and the second electronic module EM2 may include various functional modules for operating the electronic device ED.

The first electronic module EM1 may be directly mounted on a motherboard electrically connected to the display device 200, or may be mounted on a separate board and electrically connected to the motherboard via a connector (not shown). In an embodiment, the motherboard is the main circuit board MB.

In an embodiment, the first electronic module EM1 includes a control module CM (e.g., control circuit), a wireless communication module TM (e.g., a transceiver), an image input module IIM, an audio input module AIM, a memory MM, and an external interface IF (e.g., an interface circuit). A portion of the above modules may be electrically connected to the motherboard via a flexible circuit board without being mounted on the motherboard.

The control module CM controls overall operation of the electronic device ED. The control module CM may be a microprocessor. For example, the control module CM enables or disables the display device 200. The control module CM may control other modules such as the image input module IIM or the audio input module AIM on the basis of a touch signal received from the display device 200.

The control module CM may be a microprocessor connected to the electronic module 500 to control operation of the electronic module 500. In an embodiment, the control module CM may control overall operation of the electronic module 500. The control module CM may include a processor that controls the electronic module 500. For example, the control module CM may execute an algorithm for converting and reproducing images captured through the electronic module 500.

The wireless communication module TM may transmit/receive a wireless signal to/from another terminal using a Bluetooth or WiFi line. The wireless communication module TM may transmit/receive a voice signal using a general communication line. The wireless communication module TM may include a transmission unit TM1 (e.g., a transmitter), which modulates and transmits a signal to be transmitted, and a reception unit TM2 (e.g., a receiver), which demodulates a received signal.

The image input module IIM processes an image signal to convert the image signal into image data that is able to be displayed on the display device 200. The audio input module AIM receives an external audio signal through a microphone in a recording mode or a voice recognition mode, and converts the external audio signal into electric voice data. In an exemplary embodiment, the audio input module AIM includes a digital signal processor and/or an analog to digital converter for converting an analog audio signal into digital voice data.

The external interface IF may serve as an interface connected to an external charger, a wired/wireless data port, or a card socket (e.g., a memory card, a SIM/UIM card).

The second electronic module EM2 includes an audio output module AOM, a light-emitting module LM, a light-receiving module LRM, and the electronic module 500 according to an embodiment of the inventive concept. The above elements may be directly mounted on the motherboard, or may be mounted on a separate board and electrically connected to the display device 200 via a connector (not shown) or may be electrically connected to the first electronic module EM1.

In an embodiment, the audio output module AOM converts audio data received from the wireless communication module TM or audio data stored in the memory MM and outputs the converted audio data externally. In an embodiment, the audio output module AOM includes a digital signal processor and/or a digital to analog converter to convert the digital audio data to an analog audio signal for output.

The light-emitting module LM generates and outputs light. The light-emitting module LM may output infrared light. The light-emitting module LM may include a light source or element such as at least one light emitting diode (LED). The light-receiving module LRM may detect infrared light. The light-receiving module LRM may be activated when at least a predetermined level of infrared light is detected. The light-receiving module LRM may include a complementary metal-oxide-semiconductor (CMOS) sensor. After the infrared light generated by the light-emitting module LM is output, the infrared light may be reflected from an external object (e.g., a user's finger or face) and may be incident on the light-receiving module LRM. The electronic module 500 may capture an external image.

The electronic module 500 according to an embodiment of the inventive concept may be included in at least one of the first electronic module EM1 or the second electronic module EM2. For example, the electronic module 500 may be included within the second electronic module EM2 together with the audio output module AOM, the light-emitting module LM, and the light-receiving module LRM.

The electronic module 500 may detect an external subject received through the sensing region SSA, or may externally provide a sound signal such as voice or light such as infrared light through the sensing region SSA. The electronic module 500 may include a camera module or an actuator for capturing images of an external subject. The electronic module 500 will be described in more detail below. In an embodiment, the actuator is a component of a machine that is responsible for moving a mechanism. For example, the actuator could be an electric actuator and include one or more electromechanical actuators or linear motors.

Figure 4A:
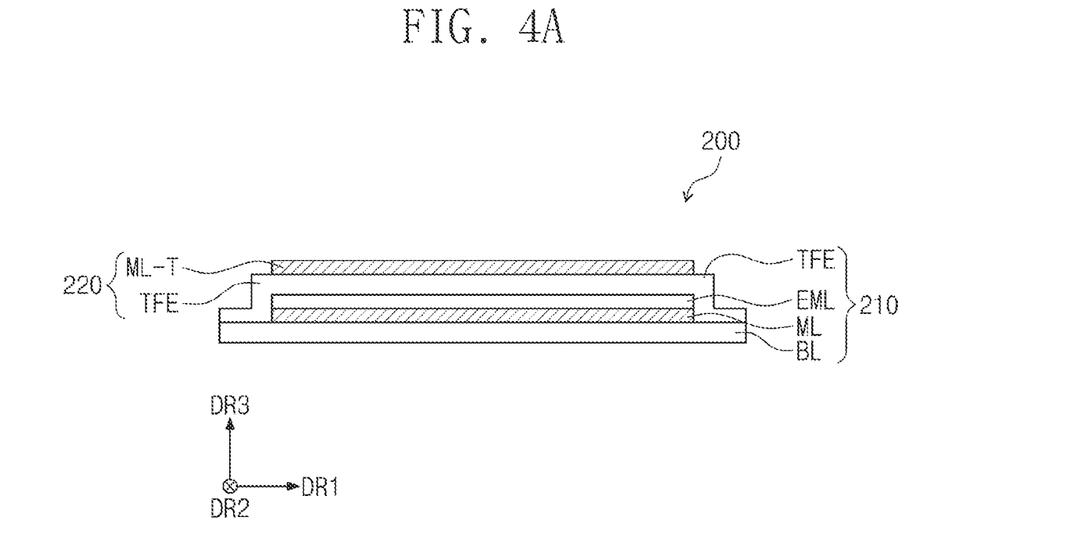
FIGS. 4A and 4B are cross-sectional views illustrating a display device according to an embodiment of the inventive concept.
Figure 4B:
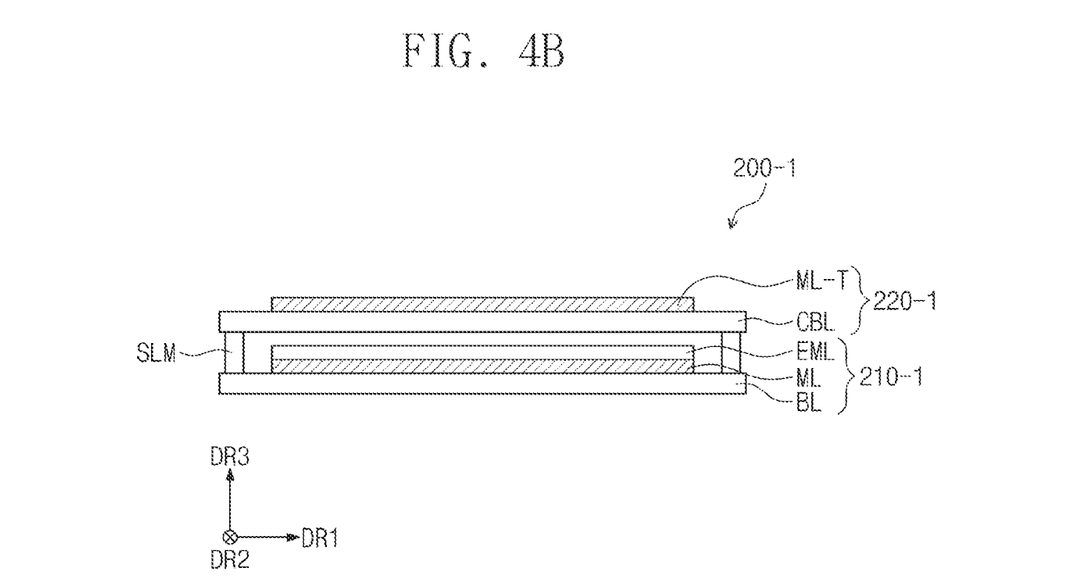

FIGS. 4A and 4B are cross-sectional views illustrating a display device according to an embodiment of the inventive concept.

FIG. 4A is a cross-sectional view illustrating a display device according to an embodiment.

Referring to FIG. 4A, the display device 200 includes the display panel 210 and the input detection unit 220. The display panel 210 includes a base substrate BL, a circuit element layer ML, a light-emitting element layer EML, and a thin-film encapsulation layer TFE. The input detection unit 220 includes a base layer TFE and a detection circuit layer ML-T. The thin-film encapsulation layer TFE and the base layer TFE may be the same element.

According to an embodiment of the inventive concept, the display panel 210 and the input detection unit 220 are formed through a continuous process. That is, the detection circuit layer ML-T may be directly formed on the thin-film encapsulation layer TFE (or base layer). For example, the detection circuit layer ML-T may directly contact the thin-film encapsulation layer TFE.

The base substrate BL may be a silicon substrate, a plastic substrate, a glass substrate, an insulating film, or a laminate structure including a plurality of insulating layers.

The circuit element layer ML may be arranged on the base substrate BL. The circuit element layer ML may include a plurality of insulating layers, a plurality of conductive layers, and a semiconductor layer. The plurality of conductive layers of the circuit element layer ML may constitute signal lines or a control circuit of a pixel.

The light-emitting element layer EML may be arranged on the circuit element layer ML. The light-emitting element layer EML may include a light-emitting layer which generates light. For example, a light-emitting layer of an organic light-emitting display panel may include an organic light-emitting material. A light-emitting layer of a quantum dot light-emitting display panel may include at least one of a quantum dot or a quantum rod.

The detection circuit layer ML-T may be arranged on the base substrate BL. For example, the detection circuit layer ML-T may overlap the base substrate BL. The detection circuit layer ML-T may include a plurality of insulating layers and a plurality of conductive layers. The plurality of conductive layers may constitute a detection electrode for detecting an external input, a detection line connected to the detection electrode, and a detection pad connected to the detection line.

FIG. 4B is a cross-sectional view illustrating a display device according to an embodiment. The elements described above with reference to FIG. 4A are referred to by the same reference signs in FIG. 7.

Referring to FIG. 4B, a display device 200-1 includes a display panel 210-1 and an input detection unit 220-1 (e.g., an input detection circuit). In an embodiment, the display device 200 of FIG. 2, FIG. 3, or FIG. 4A is implemented by the display device 200-1. In an embodiment, the display panel 210-1 includes the base substrate BL, the circuit element layer ML, and the light-emitting element layer EML. In an embodiment, the input detection unit 220-1 includes a cover substrate CBL and a detection circuit layer ML-T.

The cover substrate CBL may be arranged on the light-emitting element layer EML. For example, the cover substrate CBL may overlap the light-emitting element layer EML. The cover substrate CBL may be a silicon substrate, a plastic substrate, a glass substrate, an insulating film, or a laminate structure including a plurality of insulating layers. A predetermined space may be defined between the cover substrate CBL and the light-emitting element layer EML. The space may be filled with air or inert gas. Furthermore, in an embodiment of the inventive concept, the space may be filled with a filler such as a silicone-based polymer, an epoxy-based resin, or an acryl-based resin.

A coupling member SLM may be arranged between the base substrate BL and the cover substrate CBL. The coupling member SLM may couple the base substrate BL and the cover substrate CBL. The coupling member SLM may include an organic material such as a photocurable resin or photoplastic resin, or may include an inorganic material such as a frit seal, but is not limited thereto. In an embodiment, the coupling member SLM includes a pair of pillars or columns that are spaced apart from one another and support the cover substrate. In an embodiment, the heights of the pillars are substantially the same.

Figure 5:
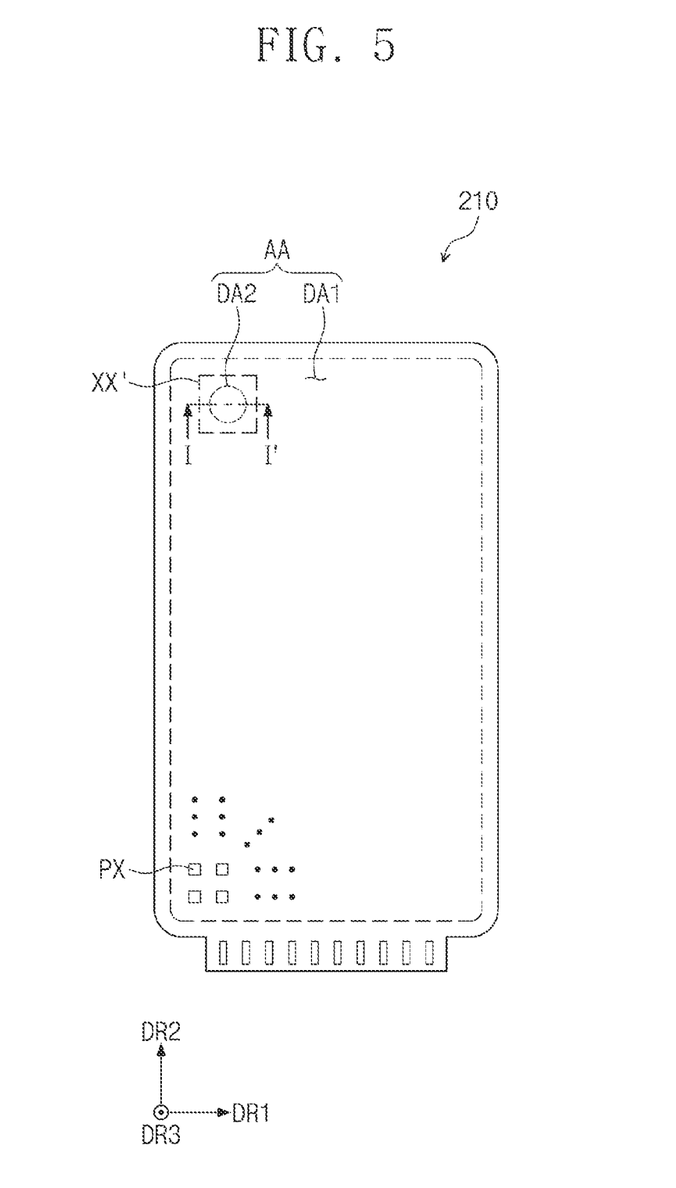
FIG. 5 is a planar view illustrating a display panel according to an embodiment of the inventive concept.

FIG. 5 is a planar view illustrating a display panel according to an embodiment of the inventive concept.

Referring to FIG. 5, the active region AA of the display panel 210 may correspond to the active region AA (see FIG. 2) of the display device 200 (see FIG. 2).

A plurality of pixels PX may be arranged in the active region AA. The plurality of pixels PX may be arranged in the first direction DR1 and in the second direction DR2. Each of the plurality of pixels PX may display one of primary colors or one of mixed colors. The primary colors may include red, green, and blue. The mixed color may include various colors such as yellow, cyan, magenta, etc. However, the colors displayed by the pixels PX are not limited thereto.

A first region DA1 and a second region DA2 may be defined in the active region AA.

In an embodiment, the electronic module 500 (see FIG. 2) is arranged under the second region DA2. The first region DA1 has a first transmittance, and the second region DA2 has a second transmittance. In an embodiment, the second transmittance is higher than the first transmittance. Therefore, a signal may be easily transferred to and/or received by the electronic module 500 (see FIG. 2) through the second region DA2. A portion of elements of the second region DA2 may be omitted to increase the transmittance. For example, a portion of pixels arranged in the second region DA2 may be removed.

In a plan view, the second region DA2 may overlap the sensing region SSA (see FIG. 2). In an embodiment, the second region DA2 has a larger area than the sensing region SSA (see FIG. 2).

In an embodiment, the first region DA1 and the second region DA2 are defined in the active region AA. The second region DA2 may be provided in correspondence with a location of the sensing region SSA (see FIG. 2). Although only one second region DA2 is illustrated in the drawings, a plurality of second regions DA2 may be provided in correspondence with a plurality of sensing regions SSA (see FIG. 2) in the case where the plurality of sensing regions SSA are provided in different locations. The second region DA2 may be surrounded by the first region DA1.

FIGS. 6A to 6D are enlarged views of the region XX' of FIG. 5, which surrounds the second region DA2.

Figure 6A:
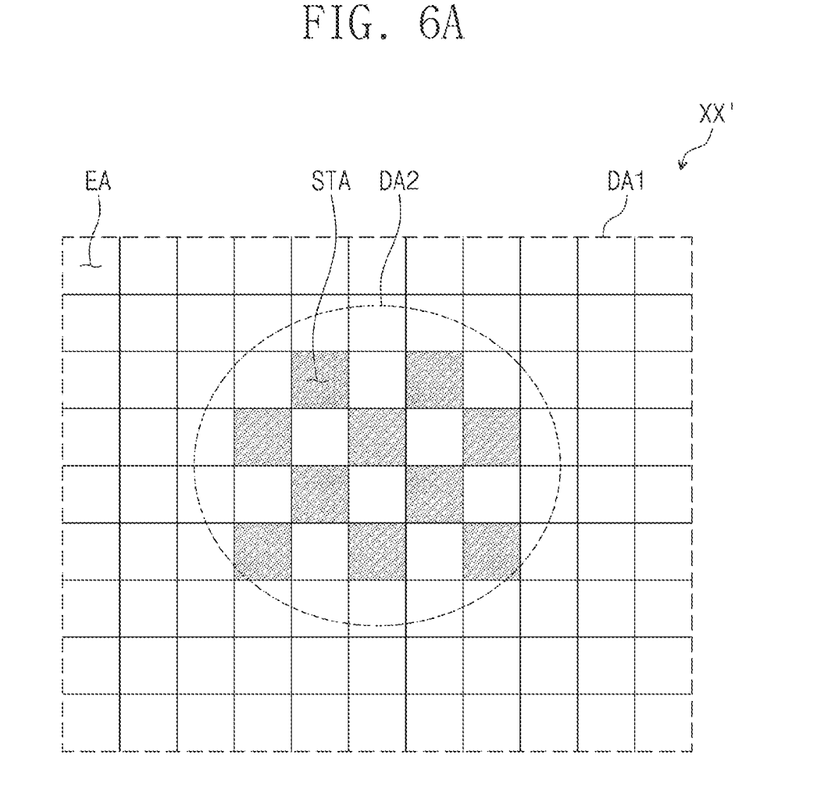
FIGS. 6A to 6D are enlarged views of region XX' of FIG. 5.
Figure 6B:
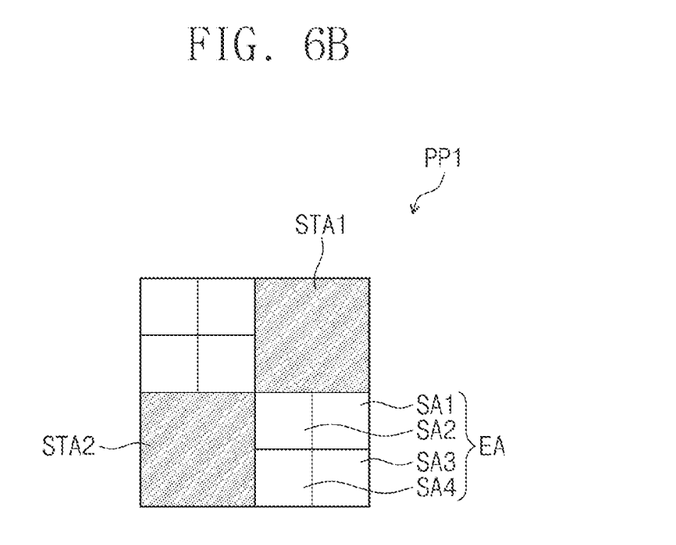
Figure 6C:
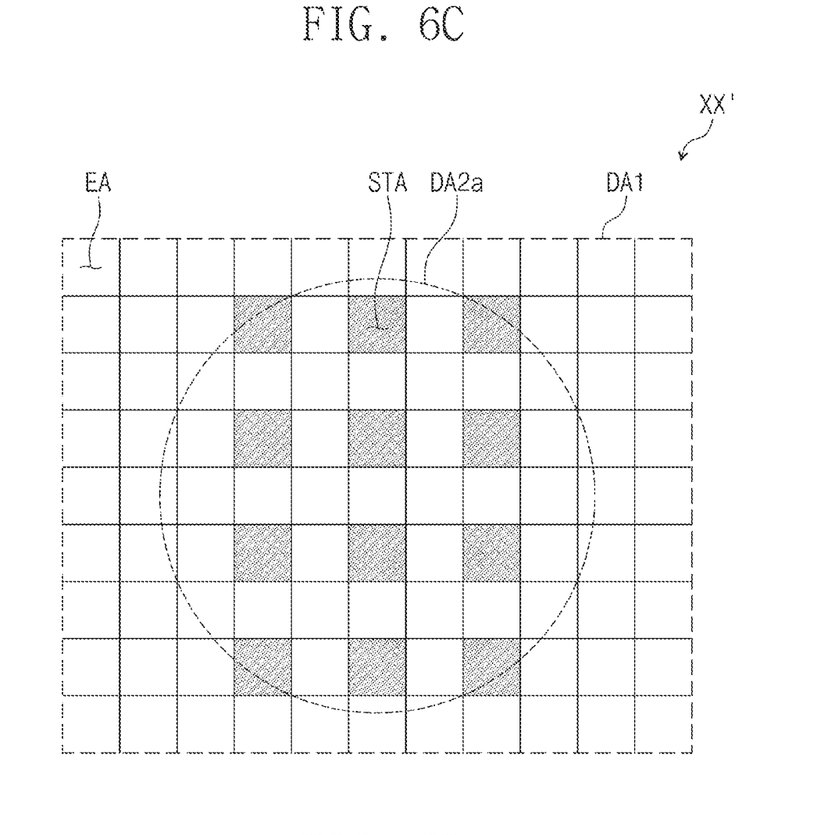
Figure 6D:
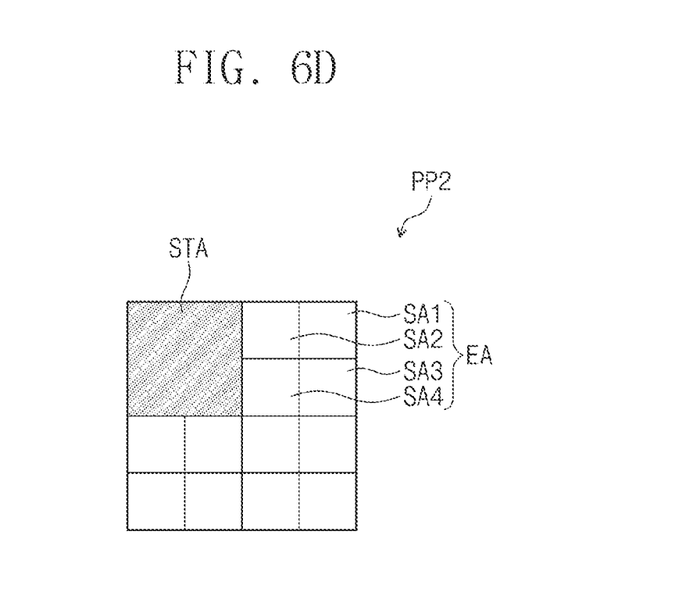

FIGS. 6A and 6C are enlarged views of the region XX', and FIGS. 6B and 6D are enlarged views of a portion of the second region DA2 of FIG. 6A. The following descriptions are provided with reference to FIG. 5.

FIGS. 6A and 6C are enlarged views of the first region DA1 and the second region DA2 defined in the display panel 210. In FIG. 6A, the first region DA1 and the second region DA2 include a plurality of light-emitting regions EA. Each of the light-emitting regions EA may include a plurality of pixels PX.

In an embodiment, the second region DA2 includes a plurality of signal transmissive regions STA. The signal transmissive regions STA may be arranged adjacent to the plurality of light-emitting regions EA. The light-emitting regions EA within the second region DA2 may be referred to as a first sub-region of the second region DA2 and the transmissive regions STA within the second region DA2 may be referred to as a second sub-region of the second region DA2. In an embodiment, the signal transmissive regions STA correspond to a region having a higher transmittance than that of the light-emitting regions EA. For example, in the second region DA2, the signal transmissive regions STA may be regions in which pixels are not arranged and the light-emitting regions EA may be regions in which pixels are arranged.

FIGS. 6A and 6C respectively illustrate second regions DA2 and DA2a including a plurality of signal transmissive regions STA arranged in different patterns. The numbers of signal transmissive regions STA illustrated in FIGS. 6A and 6C are merely illustrative, and the numbers of signal transmissive regions STA are not limited thereto. For example, the number of signal transmissive regions STA arranged in the second region DA2 of FIG. 6A may be equal to the number of signal transmissive regions STA arranged in the second region DA2a of FIG. 6C. FIGS. 6B and 6D are referred to in relation to layout patterns of the signal transmissive regions STA.

Referring to FIGS. 6B and 6D, the light-emitting regions EA may include a plurality of sub light-emitting regions SA1 to SA4. Although the drawings illustrate one light-emitting region EA as including four sub light-emitting regions that include first to fourth sub light-emitting regions SA1, SA2, SA3, and SA4, the number of sub light-emitting regions according to an embodiment may be larger or less than four.

Each of the sub light-emitting regions SA1 to SA4 may include at least one of a first-color light emitting region, a second-color light emitting region, or a third-color light emitting region. Here, the first-color light emitting region may corresponding to a region which emits red light, the second-color light emitting region may correspond to a region which emits green light, and the third-color light emitting region may correspond to a region which emits blue light. In an embodiment, each of the light-emitting regions EA may include at least one first-color light emitting region, two second-color light emitting regions, and one third-color light emitting region. For example, at least two of the first to fourth sub light-emitting regions SA1 to SA4 may include one first-color light emitting region and one second-color light emitting region respectively, and the other two of the first to fourth sub light-emitting regions SA1 to SA4 may include one second-color light emitting region and one third-color light emitting region respectively. The first to fourth sub light-emitting regions SA1 to SA4 may be freely arranged in each of the light-emitting regions EA.

In an embodiment, the transmittance of the light-emitting regions EA included in the second region DA2 is higher than the transmittance of the light-emitting regions EA included in the first region DA1. In an embodiment, a density of the sub light-emitting regions included in the light-emitting regions EA of the first region DA1 is higher than a density of the sub light-emitting regions included in the light-emitting regions EA of the second region DA2.

In FIG. 6B, the signal transmissive regions STA and the light-emitting regions EA in the second region DA2 may be arranged in a first pattern PP1. The signal transmissive regions STA and the light-emitting regions EA may be alternately arranged in the first direction DR1 and in the second direction DR2. In the second region DA2, the number of the signal transmissive regions STA and the number of the light-emitting regions EA may be substantially equal.

The signal transmissive regions STA arranged in the second region DA2 may have various layout patterns. FIG. 6B illustrates a first pattern PP1 among layout patterns of the plurality of signal transmissive regions STA. A plurality of first patterns PP1 may be repeatedly defined in the second region DA2 of the display panel 210 according to an embodiment. The first pattern PP1 may include a plurality of signal transmissive regions STA. For example, the first pattern PP1 may include a first signal transmissive region STA1 and a second signal transmissive region STA2. The first signal transmissive region STA1 and the second signal transmissive region STA2 may be arranged so as not to be adjacent to each other in the first direction DR1 and in the second direction DR2. That is, in the first pattern PP1, the signal transmissive regions STA1 and STA2 and the light-emitting region EA may be alternatively arranged in a clockwise direction.

In FIG. 6D, the signal transmissive regions STA in the second region DA2a are arranged in a second pattern PP2. The signal transmissive regions STA may be arranged adjacent to the plurality of light-emitting regions EA. Each of the signal transmissive regions STA may be adjacent to three light-emitting regions EA. In one second pattern PP2, one signal transmissive region STA and three light-emitting regions EA may be arranged. The second pattern PP2 may repeat several times within FIG. 6C.

In FIGS. 6B and 6D, the second region DA2 including the signal transmissive regions STA arranged in the first pattern PP1 may have a higher transmittance than that of the second region DA2a including the signal transmissive regions STA arranged in the second pattern PP2. That is, in an exemplary embodiment, the transmittance of the second region DA2 of FIG. 6B is higher than the transmittance of the second region DA2a of FIG. 6D.

Figure 7:
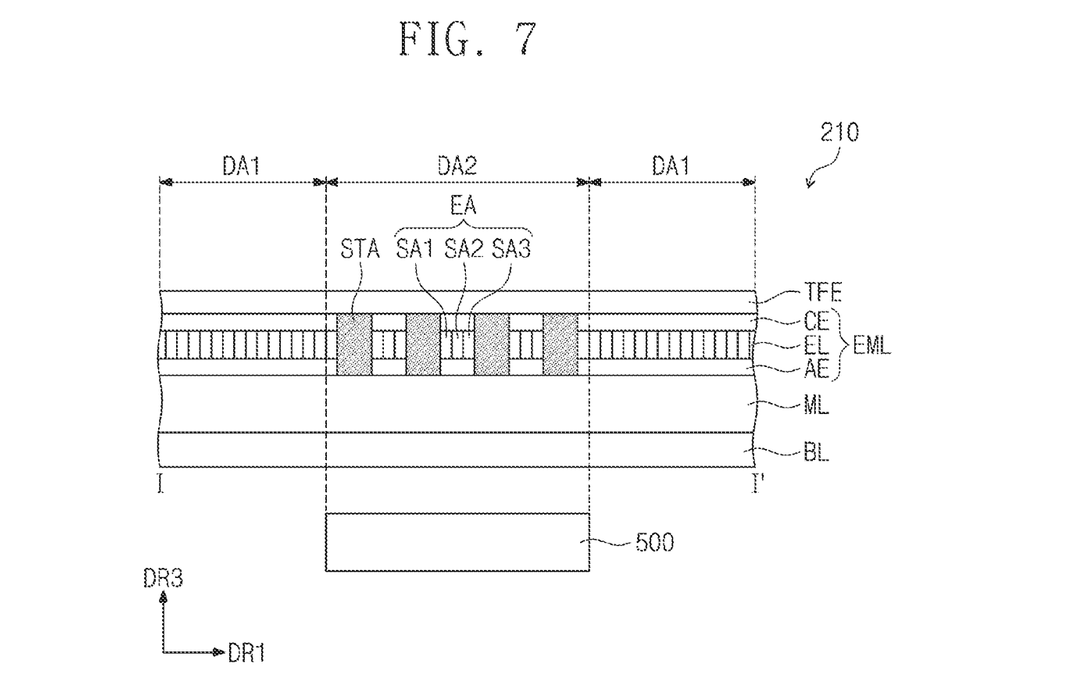
FIG. 7 is a cross-sectional view illustrating a cross-section taken along line I-I' of FIG. 5.

FIG. 7 is a cross-sectional view illustrating a cross-section taken along line I-I' of FIG. 5. FIG. 7 is a cross-sectional view of the display panel 210 according to an embodiment of the inventive concept. FIG. 7 shows the electronic module 500 arranged under the display panel 210 and overlapping the second region DA2.

Referring to FIG. 7, the display panel 210 includes the base substrate BL, the circuit element layer ML, the light-emitting element layer EML, and the thin-film encapsulation layer TFE. Descriptions overlapping with the descriptions provided above with reference to FIGS. 4A and 4B are not provided below. The base substrate BL, the circuit element layer ML, and the thin-film encapsulation layer TFE may include a transparent material.

In an embodiment, the light-emitting element layer EML includes a first electrode AE, a light-emitting layer EL, and a second electrode CE.

In an embodiment, the first electrode AE corresponds to a pixel electrode. The first electrode AE may be arranged on the circuit element layer ML. The light-emitting layer EL may be arranged on the first electrode AE. The second electrode CE may be arranged on the light-emitting layer EL. In an embodiment, the second electrode CE corresponds to a common electrode. The light-emitting layer EL may include an inorganic material. The light-emitting layer EL may include an electron control layer (not shown) and a hole control layer (not shown). In an embodiment, the first electrode AE, the second electrode CE, and the light-emitting layer EL may respectively overlap the light-emitting regions EA (see FIG. 6A).

In an embodiment, the electronic module 500 is arranged under the display panel 210 so as to overlap the second region DA2. The second region DA2 may include the light-emitting regions EA and the signal transmissive regions STA. The plurality of sub light-emitting regions SA1, SA2, and SA3 may be arranged in the light-emitting region EA. Although the drawings illustrate that one light-emitting region EA includes a first sub light-emitting region SA1, a second sub light-emitting region SA2, and a third sub light-emitting region SA3, embodiments of the inventive concept are not limited thereto. FIGS. 6A to 6D are referred to in relation to the sub light-emitting regions.

The electronic module 500 may be arranged under the signal transmissive regions STA so as to image a subject through the signal transmissive regions STA.

Figure 8:
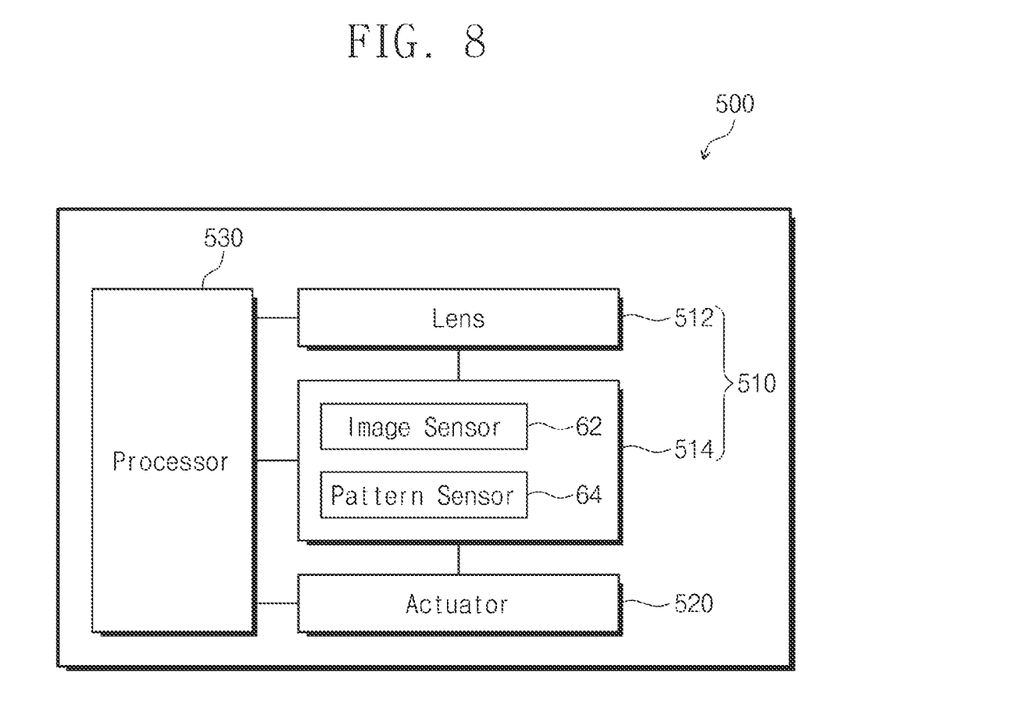
FIG. 8 is a block diagram illustrating an electronic module according to an embodiment of the inventive concept.

FIG. 8 is a block diagram illustrating an electronic module according to an embodiment of the inventive concept.

Referring to FIG. 8, the electronic module 500 includes a camera module 510, an actuator 520, and a processor 530. Hereinafter, FIG. 8 will be described with reference to FIG. 7.

The camera module 510 includes a lens 512 and a sensor 514 (e.g., a sensing device). The camera module 510 may obtain an image by imaging a subject. The camera module 510 may image the subject through the second region DA2.

The lens 512 collects light emitted from the subject. In an embodiment, the lens 512 collects light that is emitted from the subject and passes through the signal transmissive regions STA in the second region DA2. The sensor 514 may include an image sensor 62. The image sensor 62 may obtain the image of the subject using light collected through the lens 512. Here, the image includes a still image or moving image.

The sensor 514 may include a pattern sensor 64. In an embodiment, the pattern sensor 64 is configured to detect a layout pattern of the plurality of signal transmissive regions STA in the second region DA2 through which light emitted from the subject passes. The pattern sensor 64 collects pattern information about the detected layout pattern of the signal transmissive regions STA.

In an embodiment, in the case where the signal transmissive regions STA have the first pattern PP1 (see FIG. 6B), the pattern sensor 64 may detect the first pattern PP1 to collect corresponding pattern information. For example, the pattern information may indicate that the detected pattern is the first pattern PP1 or the second pattern PP2.

The actuator 520 may be connected to the camera module 510. For example, the actuator 520 may be physically connected to the camera module 510. The actuator 520 may correspond to a mechanical device which minutely moves in various directions or to various locations. The actuator 520 may be attached to the camera module 510 to move the camera module 510 to various locations or angles. In an embodiment, the actuator 520 is configured to move the camera module 510 to one of a plurality of different positions and/or angles. In an embodiment, the actuator is configured to adjust the angle of the lens 512 to one of a plurality of different angles.

In an embodiment, the actuator 520 may minutely move the camera module 510 which is imaging the subject to various locations. While performing imaging, the camera module 510 may continuously move to a plurality of locations due to movement of the actuator 520. Accordingly, the camera module 510 may obtain a plurality of images of the subject imaged at a plurality of different locations, respectively. That is, the actuator 520 may control movement of the camera module 510 so that the camera module 510 may obtain a plurality of images captured at a plurality of locations.

In an embodiment, the actuator 520 may move within the second region DA2. That is, the actuator 520 may move the camera module 510 within the second region DA2.

In an embodiment, the actuator 520 controls movement on the basis of pattern information about the signal transmissive regions STA in the second region DA2. For example, the actuator 520 may move to different locations or in different directions when the pattern information about the signal transmissive regions STA having the first pattern PP1 is collected and when the pattern information about the signal transmissive regions having the second pattern PP2 is collected.

The actuator 520 moves the camera module 510 to secure a field of view of the lens 512 which is blocked by the plurality of light-emitting regions EA in the second region DA2 while the camera module 510 is performing imaging. That is, the actuator 520 may adjust an angle of the camera module 510 so that the camera module 510 may image the subject through the signal transmissive regions STA without being hindered by the light-emitting regions EA.

The processor 530 may be connected to the camera module 510 and the actuator 520 to control an overall operation of the camera module 510 and the actuator 520. The processor 530 controls an imaging operation of the camera module 510. The processor 530 controls movement of the actuator 520. In an embodiment, the processor 530 controls the image sensor 62 and the pattern sensor 64 of the camera module 510. In an embodiment, the processor 530 receives the pattern information about the signal transmissive regions STA from the pattern sensor 64, calculates the transmittance of the second region DA2 from the pattern information, and controls the image sensor 62 so as to obtain a plurality of images on the basis of the calculated transmittance. For example, the processor 530 may instruct the actuator 520 to adjust the angle and/or the position of the camera module 510 based on the calculated transmittance.

In an embodiment, the processor 530 calculates the transmittance of the second region DA2 as a higher value when the signal transmissive regions STA have the first pattern PP1 than when the signal transmissive regions STA have the second pattern PP2.

In an embodiment, the processor 530 controls the image sensor 62 so that fewer images are obtained when the pattern information about the signal transmissive regions STA having the first pattern PP1 is received than when the pattern information about the signal transmissive regions STA having the second pattern PP2 is received. For example, the processor 530 could control the image sensor 62 to capture a first number of images during a given period when the pattern information indicates the first pattern PP1 and to capture a second number of images greater than the first number during the given period when the pattern information indicates the second pattern PP2. In an embodiment, the transmittance of the second region (e.g., DA2) is inversely proportional to the number of the first images.

In an embodiment, the processor 530 controls movement of the actuator 520 on the basis of first pattern information about a layout pattern of the signal transmissive regions STA collected from the pattern sensor 64. The processor 530 may determine second pattern information about a location pattern in which the actuator 520 moves, on the basis of the first pattern information about the layout pattern of the signal transmissive regions STA.

The processor 530 may determine different second pattern information when the first pattern information includes the first pattern PP1 and when the first pattern information includes the second pattern PP2. The processor 530 transfers, to the actuator 520, the second pattern information determined on the basis of the first pattern information. The actuator 520 may move the camera module 510 to a location within the second region DA2 on the basis of the received second pattern information.

The processor 530 may generate a second image using a plurality of first images captured through the camera module 510 and due to positioning by the actuator 520. In an embodiment, resolution of each of the first images is lower than resolution of the second image. The first images may correspond to a plurality of low-resolution images obtained by imaging the subject at a plurality of locations that vary within the second region, and the second image may be a single high-resolution image of the subject.

That is, the processor 530 may generate a high-resolution final image using a plurality of low-resolution images. In an embodiment, the processor 530 may obtain the second image from the first images using a super-resolution algorithm. Here, the super-resolution algorithm may be implemented using one of various techniques for reconstructing a high-resolution image from a low-resolution image. For example, the super-resolution algorithm may be an image processing technique using machine learning or deep learning. The super-resolution algorithm may generate a high-resolution image by performing resolution processing such as noise reduction and color adjustment on a plurality of low-resolution images.

The electronic module 500 according to an embodiment images the subject through the second region DA2 including both the light-emitting regions EA and the signal transmissive regions STA. The processor 530 according to an embodiment of the inventive concept may improve image quality using various resolution improvement algorithms including the super-resolution algorithm.

In an embodiment, the processor 530 is included in the electronic module 500 and is connected to the camera module 510 and the actuator 520. In another embodiment, the processor 530 is arranged outside the electronic module 500. For example, the processor 530 may be included in the control module CM (see FIG. 3). The control module CM is connected to the electronic module 500 to control overall operation of the electronic module 500. In an embodiment of the inventive concept where the processor 530 is omitted from the electronic module 500, an electronic device includes a display panel, an electronic module, and a processor located outside the electronic module. The display panel includes a first region containing a plurality of pixels and a second region having a higher transmittance than the first region. The electronic module is disposed under the display panel and overlaps the second region. The electronic module includes a camera module configured to image a subject to obtain a plurality of first images having a first resolution and an actuator configured to move the camera module while capturing each of the plurality of first images. The processor is configured to obtain a second image having a second resolution higher than the first resolution using the first images captured.

Figure 9:
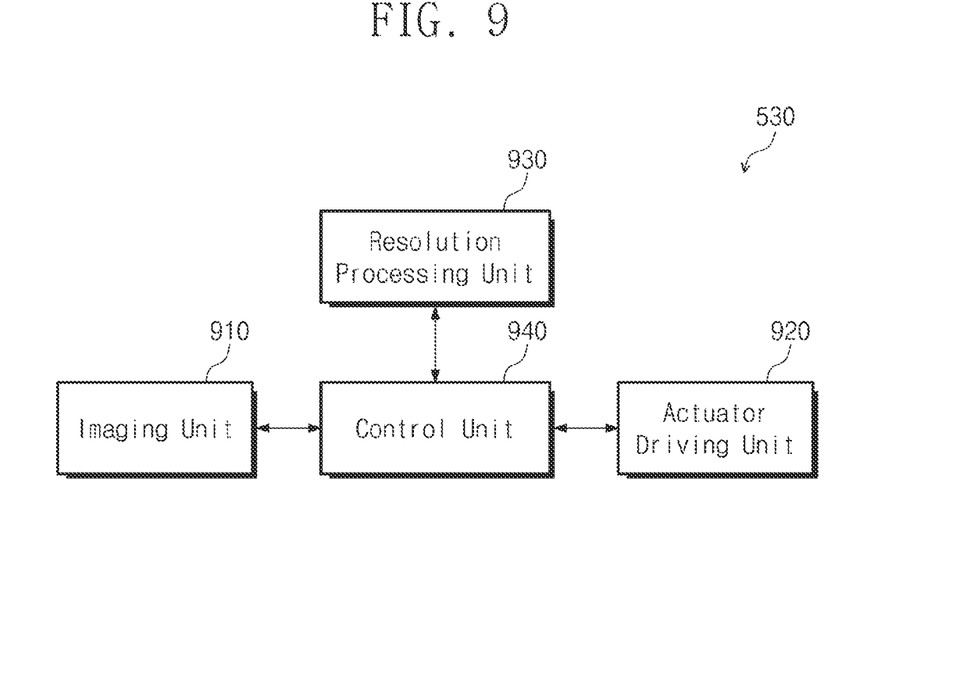
FIG. 9 is a block diagram illustrating a processor according to an embodiment of the inventive concept.

FIG. 9 is a block diagram illustrating a processor according to an embodiment of the inventive concept.

Referring to FIG. 9, the processor 530 includes an imaging unit 910, an actuator driving unit 920, a resolution processing unit 930, and a control unit 940. Descriptions will be provided with reference to FIGS. 6A to 7.

The imaging unit 910 images a subject through the camera module 510. That is, the imaging unit 910 may issue an imaging command to the camera module 510.

The actuator driving unit 920 controls movement of the actuator 520 connected to the camera module 510. That is, the actuator driving unit 920 may move the camera module 510 connected through the actuator 520. In an embodiment, the actuator driving unit 920 controls movement of the actuator 520 on the basis of the first pattern information about the layout pattern of the signal transmissive regions STA arranged in the second region DA2.

The camera module 510 and the actuator 520 may obtain a plurality of first images of the subject under control of the imaging unit 910 and the actuator driving unit 920.

In an embodiment, the resolution processing unit 930 generates a second image having a high resolution by converting the plurality of first images having a low resolution. The resolution processing unit 930 may generate a single high-resolution image using a plurality of low-resolution images using the super-resolution algorithm.

The control unit 940 may control signals between the imaging unit 910, the actuator driving unit 920, and the resolution processing unit 930, and may control an overall operation of the processor 530.

Figure 10:
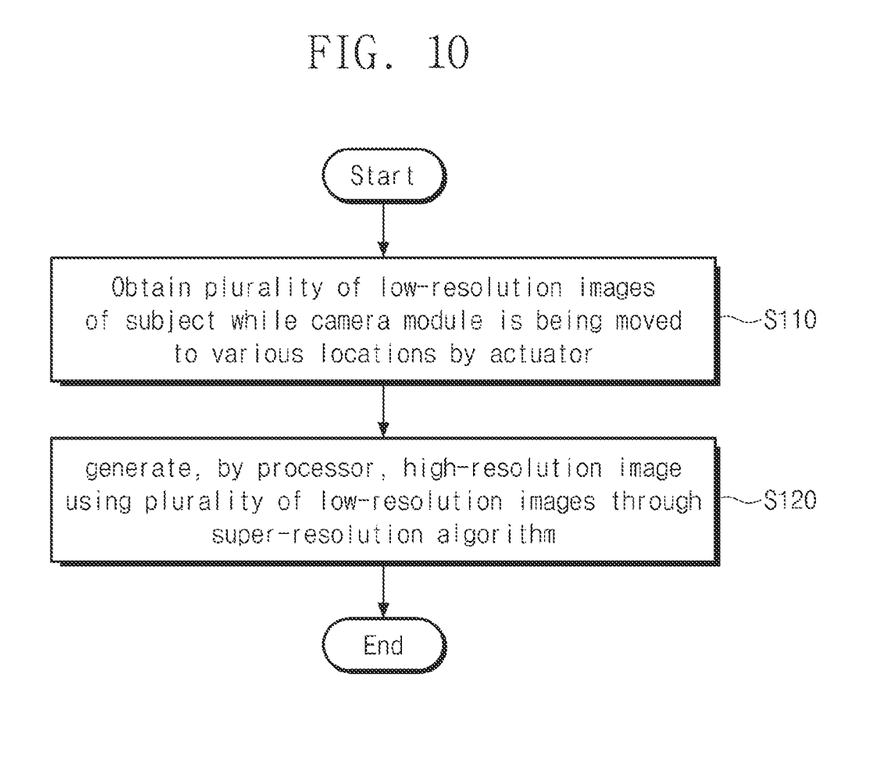
FIG. 10 is a flowchart illustrating a driving method of an electronic device according to an embodiment of the inventive concept.

FIG. 10 is a flowchart illustrating a driving method of an electronic device according to an embodiment of the inventive concept.

The driving method of an electronic device may include preparing an electronic module, capturing a plurality of first images, and obtaining a second image.

The electronic module (e.g., 500) is arranged under a display panel (e.g., 210) in which a first region in which a plurality of pixels are arranged and a second region having a higher transmittance than the first region are defined, and overlaps the second region. The electronic module may include a camera module (e.g., 510) and an actuator (e.g., 520). In an embodiment, the electronic module may include a processor (e.g., 530).

The camera module obtains a plurality of low-resolution images of a subject while being moved to various locations by the actuator (S110).

In an embodiment, the actuator (e.g., 520) receives a command from the processor (e.g., 530) to move the camera module (e.g., 510) on the basis of pattern information about signal transmissive regions. The camera module obtains the plurality of low-resolution images while moving within a second region.

The processor may use the plurality of low-resolution images to generate a high-resolution image through a super-resolution algorithm (S120). The processor may obtain the high-resolution image by freely using at least one algorithm or technique.

According to at least one embodiment of the inventive concept, an issue of image quality deterioration due to panel pixels being blocked by a camera module may be resolved. That is, an electronic device according to an embodiment of the inventive concept may obtain a plurality of low-resolution first images captured at various locations through an actuator. The electronic device according to an embodiment of the inventive concept may generate a high quality second image by converting the plurality of low-resolution first images through a processor.

An embodiment of the inventive concept may provide an electronic device including a camera with improved image quality and a driving method of the electronic device.

An embodiment of the inventive concept may resolve an issue of image quality deterioration of a camera due to transmittance reduction caused by characteristics of a UPC structure.

An embodiment of the inventive concept may obtain low-resolution images of a subject at various locations through an actuator connected to a camera module, and may obtain a high-resolution image from the low-resolution images through a super-resolution technique.

Although embodiments of the present invention have been described, it is to be understood that the present invention is not limited to these embodiments, but various changes and modifications can be made by one of ordinary skill in the art within the spirit and scope of the present invention as hereinafter claimed.

What is claimed is:

1. An electronic device comprising:
   a display panel including a first region comprising a plurality of first pixels and a second region comprising a plurality of light-emitting regions having a first transmittance and a plurality of signal transmissive regions having a second transmittance higher than the first transmittance, wherein a plurality of second pixels are arranged on the light-emitting regions and no pixel is arranged on the signal transmissive regions; and
   an electronic module disposed under the display panel and overlapping the second region, wherein the electronic module comprises:
      a camera module configured to image a subject to obtain a plurality of first images having a first resolution;
      an actuator configured to move the camera module while capturing each of the plurality of first images; and
      a processor configured to obtain a second image having a second resolution higher than the first resolution from the first images captured.

2. The electronic device of claim 1, wherein the camera module comprises:
   a lens configured to collect light emitted from the subject; and
   an image sensor configured to obtain the first images from the collected light.

3. The electronic device of claim 1, wherein the actuator controls movement of the camera module so that the plurality of first images are captured at different locations respectively.

4. The electronic device of claim 1, wherein the processor obtains the second image from the first images through a super-resolution algorithm.

5. The electronic device of claim 1, wherein the actuator controls movement of the camera module within the second region.

6. The electronic device of claim 1, wherein the a plurality of signal transmissive regions form a layout pattern and the processor sets a number of the first images based on the layout pattern.

7. The electronic device of claim 6, wherein the camera module comprises a pattern sensor configured to collect first pattern information about the layout pattern.

8. The electronic device of claim 7, wherein the processor determines second pattern information about a location pattern in which the actuator moves based on the first pattern information collected from the pattern sensor, and transfers the second pattern information to the actuator.

9. The electronic device of claim 8, wherein the actuator controls movement of the camera module based on the second pattern information.

10. The electronic device of claim 1, wherein the processor comprises:
    an actuator driving unit configured to control movement of the actuator for moving the camera module;
    an imaging unit configured to control an imaging operation of the camera module; and
    a resolution processing unit configured to generate the second image by converting the plurality of first images.

11. The electronic device of claim 10, wherein the actuator driving unit controls the movement of the actuator based on pattern information about a layout pattern of the signal transmissive regions arranged in the second region.

12. The electronic device of claim 1, wherein the processor receives transmittance information about the transmittance of the second region of the display panel, and controls the camera module and the actuator based on the received transmittance information.

13. The electronic device of claim 12, wherein the transmittance of the second region is inversely proportional to number of the plurality of first images.

14. An electronic device comprising:
    a display panel including a first region in which a plurality of pixels are arranged and a second region having a higher transmittance than the first region;
    an electronic module disposed under the display panel and comprising a camera module overlapping the second region and an actuator connected to the camera module; and
    a processor configured to control an operation of the electronic module, wherein the processor comprises: an actuator driving unit configured to instruct the actuator to move the camera module to a plurality of different locations;
    an imaging unit configured to issue an imaging command to the camera module to obtain a plurality of first images of a subject having a first resolution at the plurality of locations; and
    a resolution processing unit configured to generate a second image having a second resolution higher than the first resolution from the plurality of first images.

15. The electronic device of claim 14, wherein the plurality of locations are present within the second region.

16. The electronic device of claim 14, wherein the second region comprises a plurality of light-emitting regions having a first transmittance and a plurality of signal transmissive regions having a second transmittance higher than the first transmittance, wherein a plurality of second pixels are arranged on the light-emitting regions and no pixel is arranged on the signal transmissive regions.

17. The electronic device of claim 16, wherein the actuator driving unit determines a location pattern of the plurality of locations to which the actuator is moved, based on a layout pattern of the plurality of signal transmissive regions, and the processor set a number of the plurality of first image based on the location pattern.

18. The electronic device of claim 14, wherein the electronic module comprises the processor.

19. The electronic device of claim 14, further comprising a control module configured to control an operation of the display panel and the electronic module, wherein the control module comprises the processor.

20. A driving method of an electronic device, comprising:
  moving, by an actuator of an electronic module, a camera module of the electronic module to a plurality of locations;
  capturing, by the camera module, a plurality of different first images having a first resolution at the plurality of locations during the moving; and
  obtaining, by a processor, a second image having a second resolution higher than the first resolution from the plurality of first images,
  wherein the electronic module is disposed under a display panel, the display panel comprises a first region including a plurality of a pixels and a second region having a higher transmittance that the first region, the electronic module overlaps the second region, and the locations are located within the second region.

* * * * *